(12) United States Patent
Baumgrass et al.

(10) Patent No.: US 12,223,753 B2
(45) Date of Patent: Feb. 11, 2025

(54) CYTOMETRY DATA ANALYSIS

(71) Applicant: DEUTSCHES RHEUMA-FORSCHUNGSZENTRUM BERLIN, Berlin (DE)

(72) Inventors: Ria Baumgrass, Nuthetal (DE); Yen Hoang, Berlin (DE)

(73) Assignee: DEUTSCHES RHEUMA-FORSCHUNGSZENTRUM BERLIN, Berlin (DE)

( * ) Notice: Subject to any disclaimer, the term of this patent is extended or adjusted under 35 U.S.C. 154(b) by 805 days.

(21) Appl. No.: 17/600,131

(22) PCT Filed: Apr. 2, 2020

(86) PCT No.: PCT/EP2020/059435
§ 371 (c)(1),
(2) Date: Sep. 30, 2021

(87) PCT Pub. No.: WO2020/201443
PCT Pub. Date: Oct. 8, 2020

(65) Prior Publication Data
US 2022/0207895 A1    Jun. 30, 2022

(30) Foreign Application Priority Data

Apr. 2, 2019  (EP) .................................. 19166801

(51) Int. Cl.
*G06V 20/69* (2022.01)
*G01N 15/14* (2024.01)
(Continued)

(52) U.S. Cl.
CPC ........... *G06V 20/698* (2022.01); *G01N 15/14* (2013.01); *G06N 20/20* (2019.01); *G06V 10/82* (2022.01); *G06V 10/84* (2022.01)

(58) Field of Classification Search
CPC . G01N 15/14; G06F 18/2115; G06F 18/2414; G06F 18/2431; G06F 18/40;
(Continued)

(56) References Cited

U.S. PATENT DOCUMENTS

2018/0323049 A1* 11/2018 Röder ................ G01N 33/6851

FOREIGN PATENT DOCUMENTS

| WO | 2013038224 | 3/2013 |
|----|------------|--------|
| WO | 2014131013 | 8/2014 |

OTHER PUBLICATIONS

Li J et al "a novel approach to feature extraction from classification models based on information gene pairs", pattern recognition, elsevier, GB, vol. 41, No. 6, Jun. 1, 2008, pp. 1975-1984.

* cited by examiner

*Primary Examiner* — Jennifer Wecker
(74) *Attorney, Agent, or Firm* — JMB Davis Ben-David

(57) ABSTRACT

The invention relates to a method for classifying selected marker signals from cytometric measurements comprising a first measurement and a second measurement, wherein the first measurement comprises a cytometric measurement acquired from a first sample of particles, and the second measurement comprises a cytometric measurement acquired from a second sample of $N_2$ particles, being the number of particles in the first sample and $N_2$ being the number of particles in the second sample. Each particle $n^i{}_{N\,1}$ of the $N_1$ particles of the first sample is labelled with a number of $L_1$ fluorescent, mass or oligo markers $l^i{}_{N\,1}$. Each particle $n^1{}_{N\,2}$ of the $N_2$ particles of second sample is labelled with a number of $L_2$ fluorescent, mass or oligo markers $l^i{}_{N2}{}'$ With the acquired data a machine learning method is trained such that the marker combinations showing the most significant (Continued)

Figure 1A:
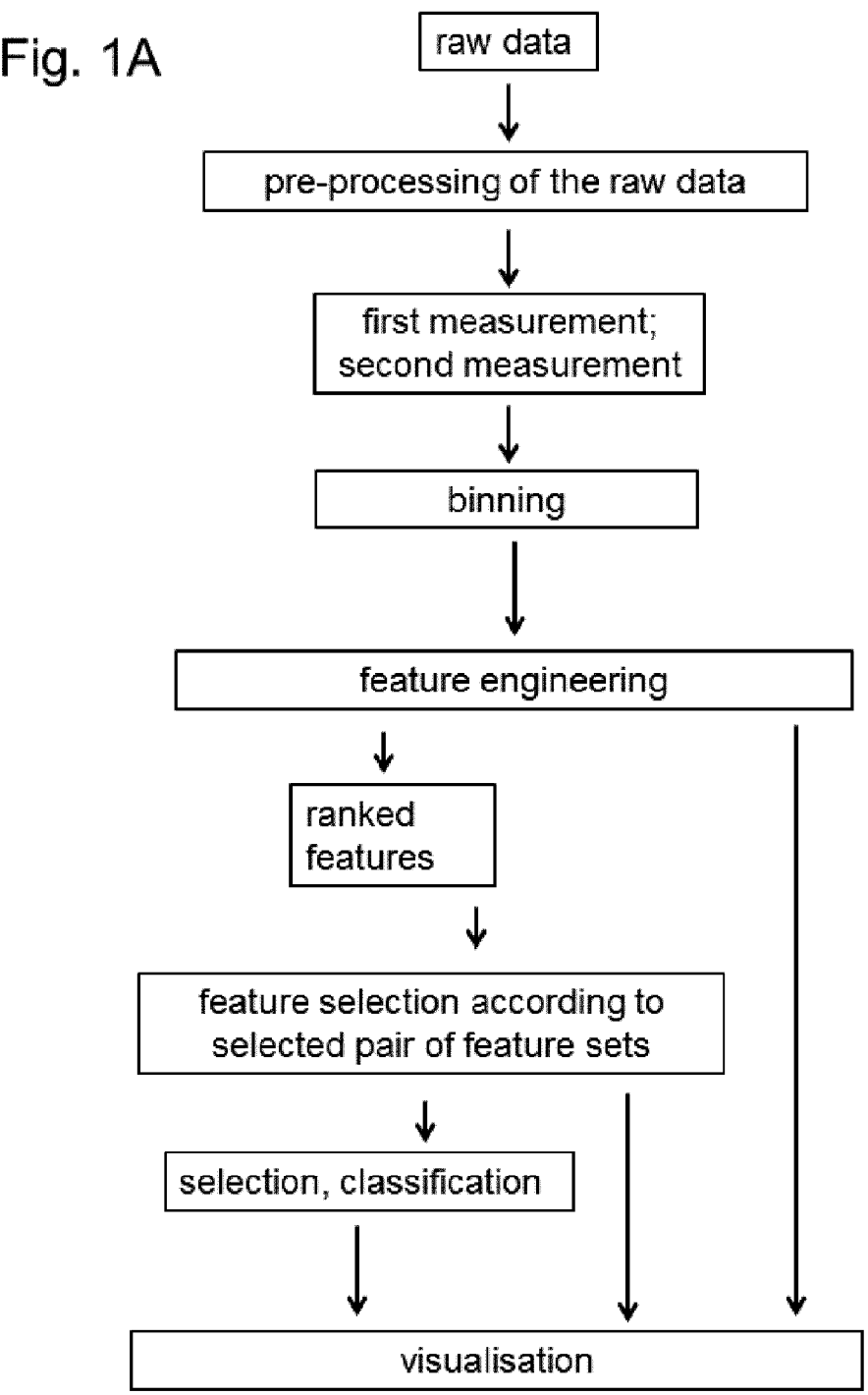

differences for two distinct populations are selected and displayed to a user in a novel fashion.

13 Claims, 8 Drawing Sheets

(51) Int. Cl.
*G06N 20/20* (2019.01)
*G06V 10/82* (2022.01)
*G06V 10/84* (2022.01)

(58) Field of Classification Search
CPC .......... G06N 20/10; G06N 20/20; G06N 3/08; G06N 5/01; G06N 7/01; G06V 10/82; G06V 10/84; G06V 20/698
See application file for complete search history.

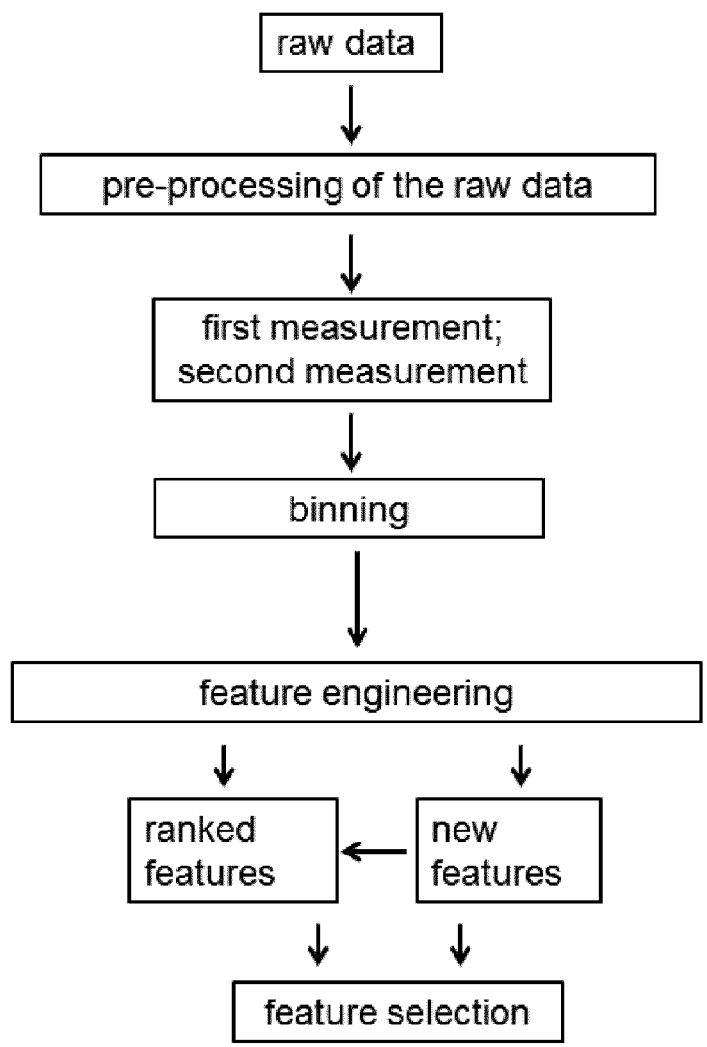

PRI - better prediction and visualization of relapse features of childhood leukemia

PRI – identification and visualization of a tissue-specific T-helper cell subset

Fig. 7

PRI approach: Feature engineering and machine learning

A Transition from conventional contour plot to bin plot: three combinatorial marker visualization

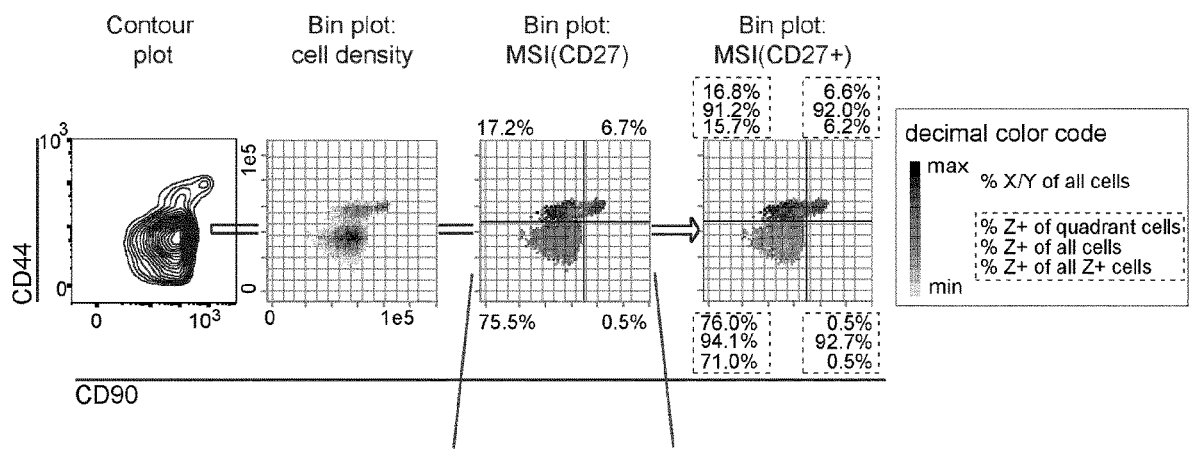

B Further feature engineering from bin plots:
Sectioning and extraction of bin information

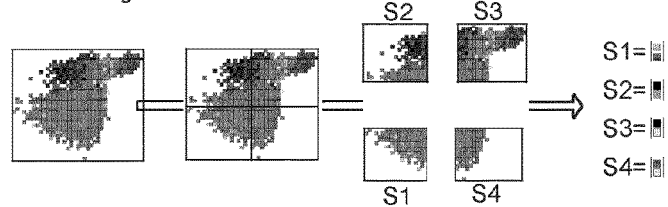

C Section information as input variables in machine learning model:
Regression analysis as a feature ranking approach

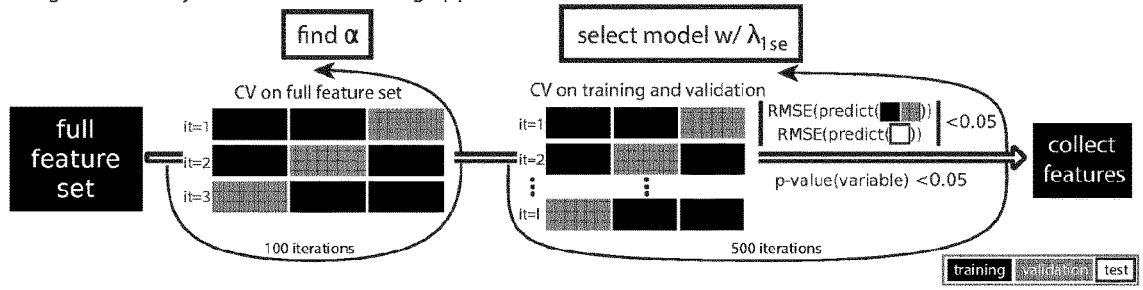

CYTOMETRY DATA ANALYSIS

CROSS-REFERENCE TO RELATED APPLICATIONS

This is the U.S. National Stage of International Patent Application No. PCT/EP2020/059435 filed on Apr. 2, 2020, which in turn claims the benefit of European Patent Application No. 19166801.1 filed on Apr. 2, 2019.

A property of a cell or a particle can be measured by cytometry. In particular, a cytometry method can be used to measure a plurality of properties of a plurality of single cells. A property of a cell can for instance be a cell cycle phase, a DNA count, a concentration of an intracellular compound, in particular of an intracellular protein, a concentration of a surface protein, a cell size, a cell shape, or an impedance.

Different cytometry methods exist including flow cytometry and mass cytometry.

For flow cytometry the cells can be labelled with a fluorescent marker (also referred to as fluorescent label), in particular with a plurality of different fluorescent markers. In a mass cytometry approach, cellular proteins can be labelled with mass markers, also known as mass labels.

Additionally, there are so-called oligo markers that are based on short oligomers that allow a differentiation of the markers by means of the labelled oligomer.

Via all methods, data of a plurality of cells for the plurality of fluorescent, mass and/or oligo markers is generated. In other words this means that high dimensional data is generated.

For an analysis of the properties of a cell and an analysis how these depend on the various factors, combinations of two and/or three markers and/or associated properties can be investigated visually. The number of combinations of two and/or three markers rise dramatically the more markers are used. The huge number of possible combinations makes any analysis difficult. In other words this means that the analysis and/or interpretation of such a high dimensional data can be complicated due to the high combinatorics. This is known as "curse of dimensionality".

For an analysis and visualisation of cytomics data, methods are known that reduce the dimensionality. In particular, previous approaches comprise a clustering method as an essential step of the algorithm. Such an approach is for instance PhenoGraph or CITRUS. Other approaches comprise a dimension reduction technique such as a t-distributed stochastic neighbour embedding (tSNE).

When cytomics data is clustered, this can lead to the loss of single cell information. Further, the clustering resolution can be limited. A clustering-based method for example cannot be applied for analysing, in particular comparing and/or discriminating between, two samples comprising particles with similar characteristics, such as e. g. activated and non-activated T-cells.

A disadvantage of a dimension reduction-based approach such as tSNE is that it takes artificial axes into account. These artificial axes render the obtained results difficult to interpret in a biological sense.

Therefore, a method is needed to analyse cytometry data in an efficient manner, wherein the results are easy to interpret in a biological manner, i.e. related to a biological context. Further, a method to visualise the cytometry data is of interest.

These objectives are achieved by a method having the features of claim 1. Advantageous embodiments are described in the subclaims.

A first aspect relates to a method for classifying selected marker signals from cytometric measurements comprising a first measurement and a second measurement. The first measurement comprises a cytometric measurement acquired from a first sample of $N_1$ particles. The second measurement comprises a cytometric measurement acquired from a second sample of $N_2$ particles. $N_1$ is the number of particles in the first sample and $N_2$ is the number of particles in the second sample.

Each particle $n_{N1}^i$ of the $N_1$ particles of the first sample is labelled with a number of $L_1$ fluorescent, mass or oligo markers $l_{N1}^j$, each particle $n_{N2}^i$ of the $N_2$ particles of second sample is labelled with a number of $L_2$ fluorescent, mass or oligo markers $l_{N2}^j$.

In particular, each fluorescent, mass or oligo marker $l_{N1}^j$ of the $L_1$ fluorescent, mass or oligo markers is associated to an entity of the respective particle $n_{N1}^i$, particularly to a different entity of the respective particle $n_{N1}^i$. Each fluorescent, mass or oligo marker $l_{N2}^j$ of the $L_2$ fluorescent, mass or oligo markers can be associated to a different entity of the respective particle $n_{N2}^i$.

The first measurement comprises for each particle $n_{N1}^i$ a detected intensity $p_{N1}^{ij}$ of each marker $l_{N1}^j$ of the respective particle. The second measurement comprises for each particle $n_{N2}^i$ a detected intensity $p_{N2}^{ij}$ of each marker $l_{N2}^j$ of the respective particle.

The method comprises the steps of:
a) binning the detected intensities of each marker $l_{N1}^j$ of the first measurement into an associated first number $B_{f1}$ of bins,
b) generating at least one associated marker function, such as a ratio of the detected intensities, in particular a ratio of the binned intensities, of two markers or a number of particles per bin of a marker,
c) generating from the first measurement a number of $S_1$ first feature sets, each first feature set relating a different combination of two binned marker intensities and the at least one associated marker function and/or a third marker intensity to each other,
d) binning the detected intensities of each marker $l_{N2}^j$ of the second measurement into an associated second number $B_{f2}$ of bins,
e) generating at least one associated marker function, such as a ratio of the detected intensities, in particular a ratio of the binned intensities, of two markers or a number of particles per bin of a marker,
f) generating from the second measurement a number of $S_2$ second feature sets, each second feature set relating a different combination of two binned marker intensities and the at least one associated marker function and/or a third marker intensity, to each other,
wherein each first feature set and each second feature set comprising the same combination of markers intensities or functions, form a pair of feature sets, and
g) providing the pairs of feature sets to a machine learning method, wherein the machine learning method determines at least one selected pair of feature sets that exhibits the largest variation between the first and the second feature set.

The first sample of particles can comprise at least one of: an inorganic polymer particle, a cell, a microorganism, and an organelle. An organelle is a subunit of a cell having a specific cellular function. The second sample of particles can comprise at least one of: an inorganic polymer particle, a cell, a microorganism, and an organelle.

In an embodiment, a cytometric measurement is a flow-cytometric measurement. In an embodiment, the cytometric measurement is a measurement by means of a fluorescence-activated cell sorting or screening (FACS). A particle can be labelled with at least one fluorescent marker (also referred to as fluorescent label), i.e. a fluorophore or a fluorophore-coupled antibody.

Alternatively, the cytometric measurement can be a mass cytometric measurement based on a mass spectrometry approach, in particular based on time of flight mass spectrometry (TOFMS) and inductively coupled plasma mass spectrometry (ICP-MS). In an embodiment, a particle can be labelled with at least one mass marker (also referred to as mass label), i.e. a mass or a mass-coupled antibody.

In particular, the first measurement and the second measurement can be determined by the same cytometry method. In an embodiment, the first measurement and the second measurement is a flow-cytometric measurement. In an embodiment, the first measurement and the second measurement is a mass-cytometric measurement.

The first measurement can be acquired separately from the second measurement. In other words this means that the first and the second measurement can be performed independent of each other.

A marker, i.e. a fluorescent marker and/or a mass marker, can bind to a particular entity of the respective particle. Each marker can label a specific entity of the particle, in particular a specific entity of a cell.

An entity of a particle can be a biomolecule, including an intracellular protein, a surface protein, a nucleic acid, and a carbohydrate of a cell.

The detected intensity can be the fluorescence or signal intensity detected at a detector.

The first and/or the second measurement can comprise a detected intensity of a marker associated to a specific entity for each single particle. By measuring the intensity of the marker associated to a certain entity, a concentration of the respective entity and/or a quantity related to the concentration, such as e.g. a fraction, can be determined. The detected intensity of a marker might also be referred to as marker intensity or signal intensity in the context of the current specification.

With respect to the first measurement, the detected intensities $p_{N1}^{ij}$ of a marker $l_{N1}^{j}$ can be binned into a predefined number of $B_{f1}$ bins, such that a binned marker intensity can be generated. In an embodiment, the detected intensities of each marker can be binned. This means that with respect to each marker, a binned marker intensity can be generated. In an embodiment, the predefined number of bins is equal for each marker. Alternatively, the predefined number of bins can be different for at least one marker. In an embodiment, the number of bins is equal for all markers, wherein a bin size is either predefined or adjusted to the detected intensities of the marker (from the first and the second measurement).

For the second measurement, the detected intensities $p_{N2}^{ij}$ of a marker $l_{N2}^{j}$ can be binned into a predefined number of $B_{f2}$ bins, generating a binned marker intensity. In an embodiment, the detected intensities related each marker can be binned, such that with respect to each marker a binned marker intensity can be generated. The predefined number of bins can be equal for each marker. In an alternative embodiment, the predefined number of bins can be different for at least one marker.

In an embodiment, the predefined numbers of bins ($B_{f1}$, $B_{f2}$) associated to the same entity in the first and in the second measurement are equal.

In an embodiment, the detected intensities $p_{N1}^{ij}$ of a marker $l_{N1}^{j}$ can be binned in a serial manner, such that a 2-dimensional bin is generated, i.e. the intensities of a first marker can be binned, and in a subsequent step, the intensities of a second marker can be binned. The combination of two binned marker intensities defines a two-dimensional bin.

In an embodiment, a 2-dimensional binning is performed in one step providing a plurality of two-dimensional bins. With the term "2-dimensional binning" a binning of a combination of two marker intensities is meant. In an embodiment, the one-step 2-dimensional binning is performed by arranging the intensities related to a first and a second marker to each other and putting a grid comprising a plurality of equal sectors on that sorted intensities, wherein each sector of the grid represents each one two-dimensional bin.

Based on the intensities of the two binned marker intensities, each particle can be related to a certain two-dimensional bin. By relating each particle to a respective bin, a reduction of the dimensionality can advantageously be provided.

In an embodiment, a further reduction of the dimensionality is obtained by pooling a plurality of bins.

At least one associated marker function can be determined for each bin, in particular for each two-dimensional bin. A marker function can be a ratio of intensities of two markers. In an embodiment, the marker function is a ratio of binned intensities of two markers. The marker function can be a number of particles per bin. According to an embodiment, the marker function is a statistical value with respect to a marker intensity of a bin, in particular one of a mean value, a median, a minimum value, a maximum value, a standard deviation, a variance, an inter quartile range, a distance, a range, a correlation, and coefficient of variation. A range can be an absolute range, which can be a difference between a maximum value and a minimum value per sample, per area and/or per quadrant. In an embodiment, the range is a relative range which is related to a maximum value and a minimum value of a total of all considered samples, in particular of the first and the second sample.

The third marker intensity can particularly be a third binned marker intensity.

A feature set relates a different combination of two binned marker intensities and at least one associated marker function to each other. Alternatively, a feature set relates a different combination of two binned marker intensities and a third marker intensity to each other. In an embodiment, the third marker intensity is a binned marker intensity.

In other words this means that a feature set can comprise three entries: a) a first binned marker intensity related to a first entity, b) a second binned marker intensity related to a second entity, and c) an associated marker function and/or a third marker intensity related to the bin determined by the first and the second binned marker intensity.

A feature set can be generated with respect to the first measurement and is referred to as first feature set. A second feature set can be a feature set generated and with respect to the second measurement. A first feature set and a second feature set that comprise the same combination of markers intensities or functions form a pair of feature sets. In an embodiment, for each combination of binned marker intensities a pair of feature sets is generated. In an embodiment, for each combination of binned marker intensities and marker functions a pair of feature sets is generated.

A plurality of pairs of feature sets can be provided to a machine learning method to identify at least one selected pair of feature sets showing the largest variation between the first feature set and the second feature set. In particular, all pairs of feature sets can be provided to a machine learning method. In other words this means that based on all pairs of feature sets the machine learning method can determine the selected pair of feature set showing the largest variation.

In other words, the phrase "identifying the pair of feature set showing the largest variation" can be stated as "identifying the pair of feature set showing a smallest similarity".

In an embodiment, a support vector machine approach is used to determine the largest variation between the first and the second feature set. In particular, a distance of the first and the second feature set to a hyperplane can be determined. The accumulated distance can be a measure characterising the similarity (or the dissimilarity) between the first and the second feature set.

Alternatively, a statistical value, such as a mean value, a variance, a range, a standard deviation and/or a cumulant can be determined for the first and the second feature set for each pair of feature sets, wherein the largest variation can be determined e.g. by a difference or ratio between the statistical value.

An alternative embodiment is characterised in that an artificial neuronal network is used to determine the variation between the first and the second feature set.

In an embodiment, the variation between the first and the second feature set is determined by means of a correlation.

By identifying the pair of feature sets showing the largest variation between the first feature set and the second feature set, the machine learning method can determine the marker combination with that the first sample can be distinguished best from the second sample. In an embodiment, the markers are identified that characterise a sample, in particular the cells or the particles of the sample, best.

An advantage of the method is that a most powerful marker combination to discriminate between different samples is identified. The most powerful marker combination is the marker combination whose associated pair of feature sets shows the largest variation between the first feature set and the second feature set. Additionally, the most powerful marker combination to characterise a specific type of particles can be determined. Further, the method can be used to characterise similarities between particles.

A determination of a particular feature set (i.e. a combination of two marker intensities and a marker function or a third marker intensity) to discriminate between different particles (different samples) is also referred to as "feature engineering".

In an embodiment, binning provides a grouping of particles, in particular a grouping of cells, based on the detected intensities, i.e. based on the properties of the particles, while maintaining the axes. This means that no artificial axes are considered. Hence, advantageously, the discrimination is based on the maintained axes and not on artificial axes. That means that the discrimination is based on the marker intensities, such that the obtained differences and/or similarities between the first and the second sample can be easily related to the respective marker intensities and the associated marker functions, such as a concentration of a specific biomolecule. Hence, the results are easy to interpret in a biological manner.

In an embodiment, each feature set is provided to the machine learning method in form of a graphical representation.

In particular, each feature set of the pairs of features sets is provided to the machine learning method in form of a graphical representation.

In an embodiment, the method is not restricted in terms of the requirement that the first measurement and/or the second measurement, in particular the pairs of feature sets, have to be provided in form of numbers, but the method can also be used when a graphical representation is provided. This advantageously increases the field of applications of the method.

An embodiment is characterised in that prior to the cytometric measurement a first solution is applied to the first sample of particles and a second solution is applied to the second sample of particles. The first solution is a control medium or the first solution comprises one of a: first stimulating compound for stimulating the particles, a first inhibiting compound for inhibiting the particles or a first combination of a first stimulating and a first inhibiting compound. The second solution is a control medium or the second solution comprises one of a: second stimulating compound for stimulating the particles, a second inhibiting compound for inhibiting the particles or a second combination of a second stimulating and a second inhibiting compound.

A control medium can be a basal medium without any supplemental additives.

A first and/or a second stimulating compound can be an activator of intracellular cytokine production. A cytokine can be a chemokine, an interferon, an interleukin, a lymphokin or a tumour necrosis factor.

In an embodiment, a first and/or a second stimulating compound can be an activator of a kinase. In an embodiment, the first and/or second stimulating compound is an activator of protein kinase C, in particular phorbol 12-myristate 13-acetate (PMA). An activator of intracellular cytokine production can be ionomycin or an anti-CD3/anti-CD28 antibody.

A first and/or a second inhibiting compound can be a kinase inhibitor. In an embodiment, a first and/or second inhibiting compound is a MEK inhibitor, in particular U0128.

In an embodiment, the first solution differs from the second solution. The difference can be that the first activating or inhibiting compound differs from the second activating or inhibiting compound, respectively. In an embodiment, the first solution comprises a first activating compound and the second solution comprises a second inhibiting compound.

According to an embodiment, the first activating (or inhibiting) compound is another chemical substance than the second activating (or inhibiting) compound.

In an embodiment, the first solution comprises a control medium while the second solution comprises one of a second stimulating compound, a second inhibiting compound, and a second combination of a second stimulating and a second inhibiting compound.

According to an embodiment, the first activating (or inhibiting) compound can be the same as the second activating (or inhibiting) compound. In an embodiment, the concentration or activity of the first activating (or inhibiting) compound differs from the concentration or activity of the second activating (or inhibiting) compound.

In an embodiment, the first solution is applied for a first time interval to the first sample. The second solution can be applied for a second time interval to the second sample. The first time interval can differ from the second time interval. Alternatively, the first time interval can be equal to the second time interval.

The present invention can be used to analyse samples receiving stimuli of different durations, different strengths or different kinds, and the associated effects on the marker intensities can be compared.

In an embodiment, the first sample of particles comprises particles of a first type and the second sample of particles comprises particles of a second type.

In particular, particles of the first type can differ in at least one property from particles of the second type. In an embodiment, the first and the second sample of particles comprise cells.

In an embodiment, the particles of the first type and the particles of the second type are related to the same organism, but are associated to different tissues of that organism.

Alternatively, the particles of the first type can comprise cells of a first organism and the particles of the second type can comprise cells of a second organism differing from the first organism.

In an embodiment, the particles of the first type comprise normal cells and the particles of the second type comprise abnormal cells. An abnormal cell can be a cancer cell. Alternatively, the particles of the first type can comprise cells of a first abnormal type and the particles of the second type can comprise cells of a second abnormal type, wherein the first abnormal type differs from the second abnormal type. In an embodiment, the cells of the first abnormal type and cells of the second abnormal type are related to the same tissue.

In an embodiment, the first abnormal type is equal to the second abnormal type but the respective samples are related to different individuals.

By means of the method, the most powerful marker combination can be determined to distinguish between different cell types. In an embodiment, cells related to a specific tissue and/or a specific organism can be characterised by means of the most powerful marker combination.

The most powerful marker combination that characterises a specific type of particles, e.g. cells related to a specific disease, such as specific cancer cells, can be identified.

In an embodiment, a first solution can be applied to the first sample comprising cells of the first type and a second solution can be applied to the second sample comprising cells of the second type. This way the effects of different compounds, in particular different composition of the first and/or the second solution, on different types of particles can be investigated.

In an embodiment, the method can be used to distinguish between a type of particles that appropriately responds to a specific composition of the first and/or the second solution and another type of particles that does not respond.

The specific composition of the first and/or the second solution can be based on a composition of a medical therapy, thus providing information, whether a specific therapy would be a promising target with respect to a specific type of particles.

The method can be used to identify a modified cell type. In an embodiment the method can identify a cell type modified in case of a specific type of cancer.

According to an embodiment, the machine learning method determines a selected plurality of pairs of feature sets, wherein each pair of feature sets of the selected plurality of pairs of feature sets exhibits a variation between the first and the second feature set larger than a predefined threshold.

In other words this means that not only the selected pair of feature sets exhibiting the largest variation between the first and the second feature set is determined, but a plurality of selected pairs of feature sets exhibiting a variation larger than a threshold. Hence, advantageously not only the largest variation between the first and the second sample is taken into account but additionally further differences that can be associated to other marker parameters and can be associated to other properties of the respective samples.

When the plurality of selected pairs of feature sets is taken into account a plurality of features can be specified in that the first and the second sample differ. This can advantageously increase the accuracy of the respective prediction and/or characterisation of the particles of the samples.

In an embodiment, the pairs of feature sets are ranked with respect to the variation between the first and the second feature set. The pairs of feature sets can be ranked such that the selected pair of feature sets has a first rank. Pairs of feature sets with decreasing variation are ranked in decreasing order having a correspondingly lower rank. In an embodiment, the plurality of selected pairs of feature sets comprises the pairs of feature sets related to rank one and rank two. This means that the plurality of selected pairs of feature sets comprises the pairs of feature sets exhibiting the largest and the second largest variation between the first and the second feature set.

In an embodiment, the plurality of selected pairs of feature sets comprises at least the pairs of feature sets related to rank one to rank five. In an embodiment, the plurality of selected pairs of feature sets comprises at least the pairs of feature sets related to rank one to rank ten. Alternatively, the plurality of selected pairs of feature sets comprises at least the pairs of feature sets related to rank one to rank 20.

In an embodiment, a third measurement is provided. The third measurement comprises a cytometric measurement acquired from a third sample of $N_3$ particles, wherein $N_3$ is the number of particles in the third sample. Each particle $n_{N3}^i$ of the $N_3$ particles of the third sample is labelled with a number of $L_3$ fluorescent, mass or oligo markers, wherein each fluorescent, mass or oligo marker $l_{N3}^j$ of the $L_3$ fluorescent, mass or oligo markers is associated to a different entity of the respective particle $n_{N3}^i$. The third measurement comprises for each particle $n_{N3}^i$ the detected intensity $p_{N3}^{ij}$ of each marker $l_{N3}^j$ of the respective particle. The detected intensities of each marker $l_{N3}^j$ of the third measurement are binned into an associated third number $B_{f3}$ of bins. At least one associated marker function is generated. From the third measurement, a number of $S_3$ third feature sets are generated, each third feature set relating a different combination of two binned marker intensities and the at least one associated marker function and/or a third marker intensity to each other. The third feature sets are compared with the first and/or the second feature sets, and a weight measure is determined that gives a probability for particles of the third sample to be associated with the first sample or the second sample.

In an embodiment, a number of $S_3$ third feature sets based on the third measurement is generated in accordance with the number of first and/or second feature sets generated based on the first and/or the second measurement, respectively.

The method is particularly configured to provide a probability for a particle of the third sample to be associated with the first or the second sample. The method can classify particles of the third sample to be associated with the first or the second sample.

In an embodiment, an unknown type of particles (third sample) can be analysed by means of the method and classified to be associated with particles of the first or the second sample.

In an embodiment, the method determines by means of classification whether particles of a third sample respond to a specific composition of the first and/or a second solution.

In an embodiment the method determines by means of classification, whether cells of a third sample respond to a specific therapy.

According to an embodiment, the machine learning method is one of a naïve Bayes classifier algorithm, a K means clustering algorithm, a support vector machine algorithm, a linear regression, a logistic regression, a random forest, a decision tree, a nearest neighbour algorithm, and/or an artificial neuronal network.

The method can comprise a supervised machine learning algorithm. Alternatively, the method can comprise an unsupervised machine learning algorithm.

In one embodiment, the artificial neural network is a convolutional neural network (CNN).

In an embodiment, the artificial neural network is used to provide a probability for a particle of the third sample to be associated with the first or the second sample. In other words this means that the artificial neural network can be used to classify the third sample to be associated to the first or the second sample, wherein at least one selected pair of feature sets is determined to distinguish between the first and the second sample.

In an embodiment, a naïve Bayes classifier algorithm is used to give a probability for a particle of the third sample to be associated with the first or the second sample, i.e. used to classify the third sample to be associated to the first or the second sample.

A regression method can be used to classify the third sample to be associated to the first or the second sample. In an embodiment, the regression method is used to determine the at least one selected pair of feature sets. A regression method can be a linear regression. In an embodiment, the regression method is a logistic regression. Alternatively, the regression method can be a multinomial regression method, a lasso regression method, a ridge regression method or an elastic-net regression method.

In an embodiment, a decision tree is used to give a probability for a particle of the third sample to be associated with the first or the second sample. In an embodiment, the decision tree is used to determine the at least one selected pair of feature sets. In an alternative embodiment, a random forest method determines the probability for a particle of the third sample to be associated with the first or the second sample. Alternatively, the random forest method determines the at least one selected pair of feature sets.

In an embodiment, the machine learning algorithm that selects the pair of feature sets that exhibits the largest variation between the first and the second feature set is a support vector machine method. In an embodiment, the support vector machine method is used to classify the third sample to be associated to the first or the second sample.

An embodiment is characterised in that a wrapper method is applied to give a probability for a particle of the third sample to be associated with the first or the second sample. A wrapper method can be used to determine the at least one selected pair of feature sets. In an embodiment, the wrapper method is a forward selection method, a backward selection method or an exhaustive search method.

In an embodiment, the graphical representation of each feature set, particularly of the feature sets comprised in the at least one selected pair of feature sets, comprises a coordinate system with an abscissa and an ordinate, wherein the two binned marker intensities of the feature set are plotted along the abscissa and the ordinate, and the at least one associated marker function and/or the third marker intensity is represented by a colour according to a predefined colour scale or a grey level according to a predefined grey scale.

The graphical representation can be referred to as triplot.

The graphical representation for the at least one selected pair of feature sets can be generated. In an embodiment, for each feature set of the selected plurality of pairs of feature sets the graphical representation is generated.

In an embodiment, graphical representation for the first feature sets, the second feature sets and/or the third feature sets is generated.

An embodiment is characterised in that at least one of the following is displayed on a display:
the at least one selected pair of feature sets,
the graphical representations of the feature sets comprised in the at least one selected pair of feature sets,
the two binned marker intensities and the at least one associated marker function and/or a third marker intensity associated to the at least one pair of feature sets,
the selected plurality of pairs of feature sets,
a plurality of graphical representations of the feature sets comprised in the selected plurality of pairs of feature sets, and/or
the two binned marker intensities and the at least one associated marker function and/or a third marker intensity associated to the plurality of selected pairs of feature sets.

In an embodiment, the at least one selected pair of feature sets is displayed by displaying a marker identifier of the entities related to the first and the second binned intensities and an identifier related to the associated marker function and/or a third marker. In an embodiment, the names of the labelled biomolecules to that the first and the second binned intensities are related are displayed as well as the name of the associated marker function and/or a third marker.

In an embodiment, the two binned marker intensities and the at least one associated marker function and/or a third marker intensity associated to the at least one pair of feature sets can be displayed in terms of a table. Alternatively, the two binned marker intensities and the at least one associated marker function and/or a third marker intensity associated to the at least one pair of feature sets can be displayed in a matrix form.

In an embodiment, at least one triplot is displayed. In particular, the triplot of the selected feature set is displayed. In an embodiment, the triplots related to the selected plurality of pairs of feature sets are displayed.

In an embodiment, the number of $L_1$ fluorescent, mass or oligo markers and/or the number of $L_2$ fluorescent, mass or oligo markers and/or the number of $L_3$ fluorescent, mass or oligo markers comprises at least three fluorescent, mass or oligo markers, in particular at least 10 fluorescent, mass or oligo markers, in particular at least 20 fluorescent, mass or oligo markers, in particular at least 50 fluorescent, mass or oligo markers, in particular at least 100 fluorescent, mass or oligo markers.

According to an embodiment, the number of $L_1$ fluorescent, mass or oligo markers, the number of $L_2$ fluorescent, mass or oligo markers and the number of $L_3$ fluorescent, mass or oligo markers is equal.

In particular, the respective fluorescent markers or the respective mass markers are equal in the first and the second measurement (and the third measurement). This means that the same entities of the particles can be labelled by the same markers in the different samples.

In an embodiment, the first number of bins and/or the second number of bins and/or the third number of bins is at least 4, is in particular at least 10, is in particular at least 20, is in particular at least 50, is in particular at least 100, is in particular at least 200, is in particular at least 300, is in particular at least 500.

In an embodiment, the first number of bins is equal to the second number of bins and/or the third number of bins. According to an invention the intensities related to a certain marker are binned into the same number of bins for the first sample, the second sample and the third sample. This advantageously simplifies a comparison of the respective feature sets related to the first sample, the second sample and the third sample.

According to an embodiment, the first number of bins and/or the second number of bins and/or the third number of bins are configured such that each two-dimensional bin defined by the first number of bins and/or the second number of bins and/or the third number of bins is of equal size.

In an embodiment, the intensities of each marker 1 of the first measurement are binned into an equal first number of $B_{f1}$ associated bins. In an alternative embodiment, the intensity of at least one marker is binned into a number of bins differing from the number of bins in that at least one other marker is binned.

According to an embodiment, before step g) each first feature set and/or each second feature set is filtered, particularly by means of a noise filter.

In an embodiment, a bin comprising less than 20 entries is regarded or treated like a bin with no entries by the method. This means that any bin comprising less than 20 entries is considered in the subsequent analysis as an empty bin, i.e. a bin without an entry. An embodiment is characterised in that a bin with less than 10 entries is regarded as a bin without an entry. Alternatively, a bin with less than 5 entries can be regarded as a bin without an entry. In an embodiment, a bin with less than 50 entries can be regarded as a bin without an entry.

Another aspect of the invention is related to a computer programme comprising instructions which, when the programme is executed by a computer, cause the computer to carry out at least the steps a)-g) of the method of claim 1.

Figure 1B:
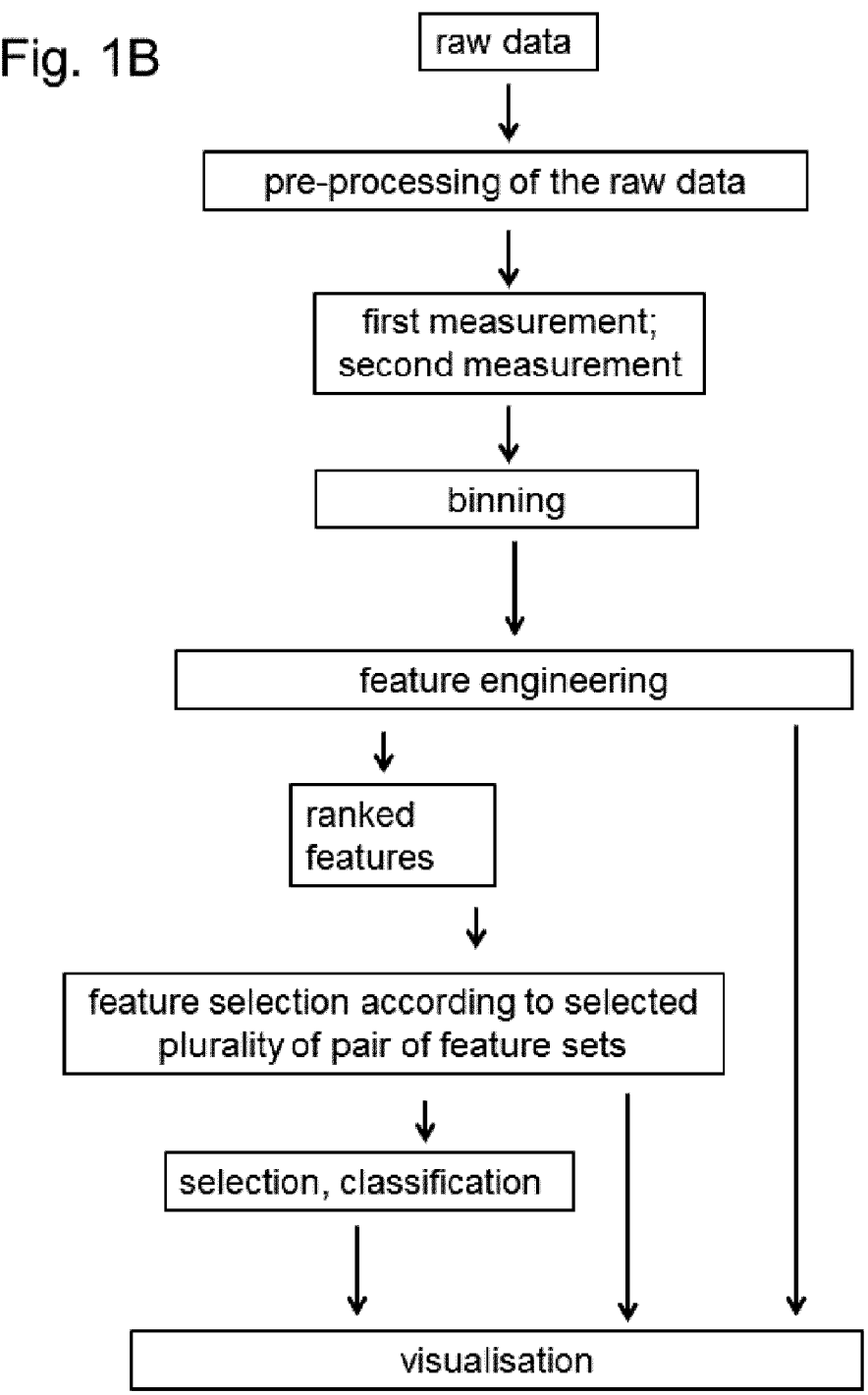

In the following, further features, advantages and embodiments of the present invention are explained with reference to the Figures, wherein FIG. 1A-C show a workflow of an embodiment of the method, FIG. 2-FIG. 6 show various examples for the applicability of triplots, and FIG. 7 illustrates the training and configuration process of the machine learning method.

FIGS. 1A and B illustrate a work flow of the method according to an embodiment. Raw data can comprise data provided by flow cytometry. In an alternative embodiment, raw data can comprise data provided by mass cytometry. Raw data can comprise a plurality of particle data entries, wherein each particle data entry is related to a measured particle. In particular, a particle can be a cell. Each particle data entry can comprise a plurality of label entries, each being related to a particular fluorescent, mass or oligo marker. A label entry can be a raw intensity related to a marker detected for a particular particle.

The method can comprise a pre-processing step of the raw data. A pre-processing step can be a removal of a particle data entry. In an embodiment, a particle data entry is removed for example when the particle data entry relates to a dead cell or a cell aggregate. Alternatively, a particle data entry can be removed when it is a doublet. A pre-processing step can comprise a pre-gating on specific population/cell types, such as T cells, CD4+ T cells, NK cells, B cells, or monocytes.

According to an embodiment, a pre-processing step is a transformation step. In particular, the transformation step can comprise a transformation of the plurality of label entries, i.e. a transformation of the raw intensities. The raw intensities can be transformed performing an inverse hyperbolic sine transformation, also referred to as a sin h transformation, generating the associated detected intensities.

In an alternative embodiment, the pre-processing step comprises a bi-exponential transformation step. An embodiment is characterised by a linear-logarithmic transformation step.

A first measurement can comprise the detected intensities related to a first sample. A second measurement can comprise the detected intensities related to a second sample. The first sample can comprise cells of a first cell type. The second sample can comprise cells of a second cell type, differing from the first cell type in at least one property. According to an embodiment, the first sample can comprise cells treated with a first solution while the second sample can comprise cells treated with a second solution.

The detected intensities of the first measurement can be binned, this means that pre-processed data can be binned, in particular the a sin h transformed data. In an embodiment, the detected intensities related to a marker are binned into binning intervals of equal size. The size of a binning interval can be 0.2, particularly if the a sin h transformed data are used. In another embodiment, the size of a binning interval is 0.15.

In an embodiment, two-dimensional bins are generated via the binning. A two-dimensional bin can be generated by a binning of a combination of two marker intensities. In an embodiment, binning provides a grouping of particles, in particular a grouping of cells, based on their properties. In an embodiment, 2-dimensional bins of an interval size of 0.2×0.2 are generated. Alternatively, 2-dimensional bins of a size of 0.15×0.15 can be generated.

In an embodiment, the one-step 2-dimensional binning is performed by arranging the intensities related to a first and a second marker to each other and putting a grid comprising a plurality of sectors on that sorted intensities, wherein each sector of the grid represents each one two-dimensional bin. Each sector of the plurality of sectors can be identical. In an embodiment, each sector has a square shape.

Feature engineering can comprise the generation of at least one feature set, wherein the feature set relates a different combination of two binned marker intensities and the at least one associated marker function and/or a third marker intensity to each other.

Further, the feature sets related to the first (first feature set) and the second measurement (second feature set) can be generated. The first feature set and the second feature set can comprise the same combination of markers intensities or functions are generated, which form a pair of feature sets.

The feature sets can be visualised, in particular the pairs of feature sets are visualised. In particular, the respective triplot is generated. The triplot can be displayed (see also FIGS. 2-4).

The feature sets can be ranked. The pairs of feature sets can be ranked according to the variation between the first and the second feature set. The at least one selected pair of feature sets is determined that exhibits the largest variation between the first and the second feature set. The at least one selected pair of feature sets can be used to distinguish between the first and the second measurement. The at least one selected pair of feature sets can be used to characterise the first and/or the second measurement, in particular to characterise particles of the associated first and/or second sample. In particular, the at least one selected pair of feature sets can provide a characterisation of the cells related to the first and/or the second sample (FIG. 1A).

FIG. 1B shows the workflow of the method in that a selected plurality of pairs of feature sets is determined, wherein each pair of feature sets of the selected plurality of pairs of feature sets exhibits a variation between the first and the second feature set larger than a predefined threshold. The predefined threshold can be set such that at least the pairs of feature sets are selected exhibiting the largest to fifth largest variation between the first and the second feature set. Hence, the selected plurality of feature sets can be used to distinguish between the first and the second measurement. The selected plurality can be used to characterise the particles of the associated first and/or second sample.

In FIG. 10 it is illustrated that new features can be generated. For instance, the triplot is subdivided in four quadrants. The bins of each quadrant can be merged, such that a further reduction of the dimensionality can be achieved. The new features can also be ranked and can be included in the feature selection.

Figure 2:
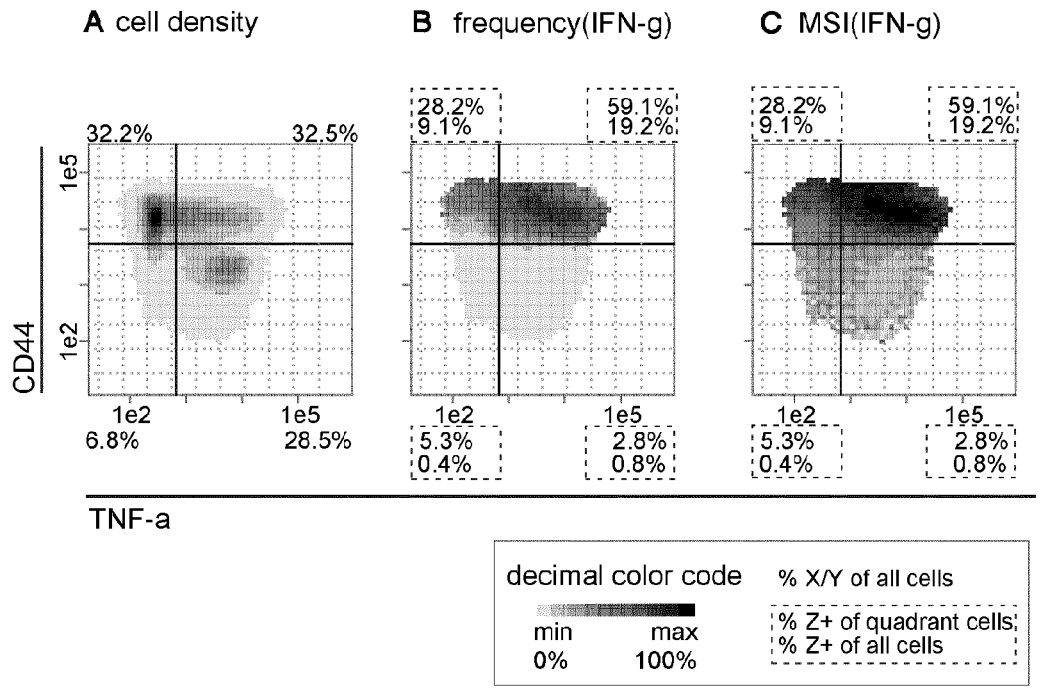
Figure 3:
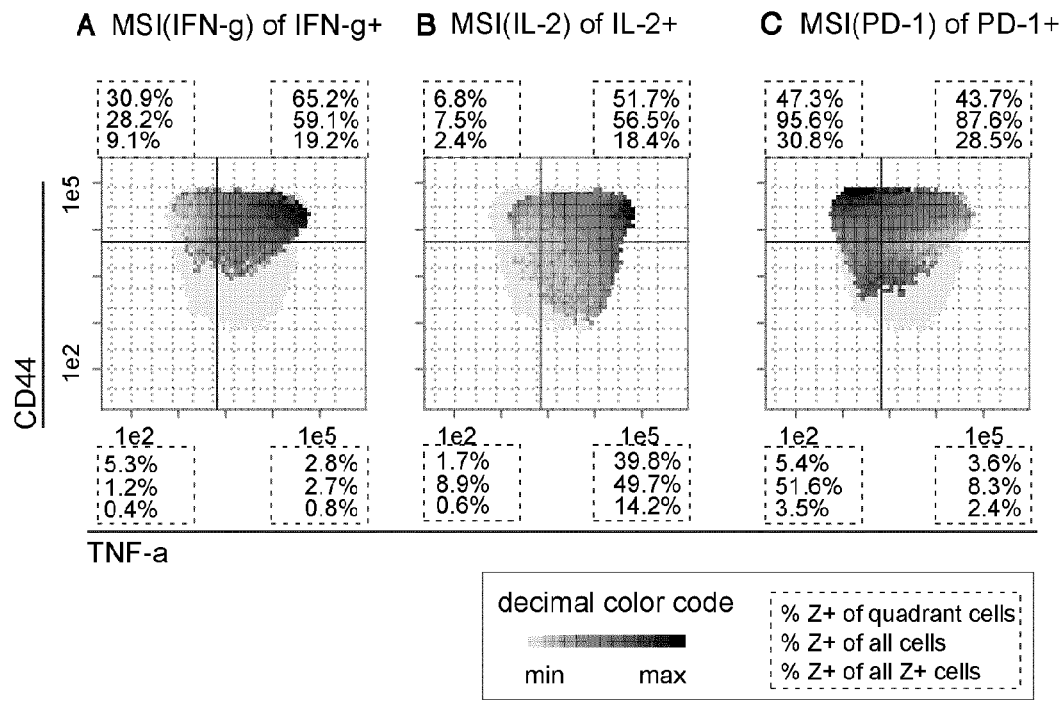
Figure 4:
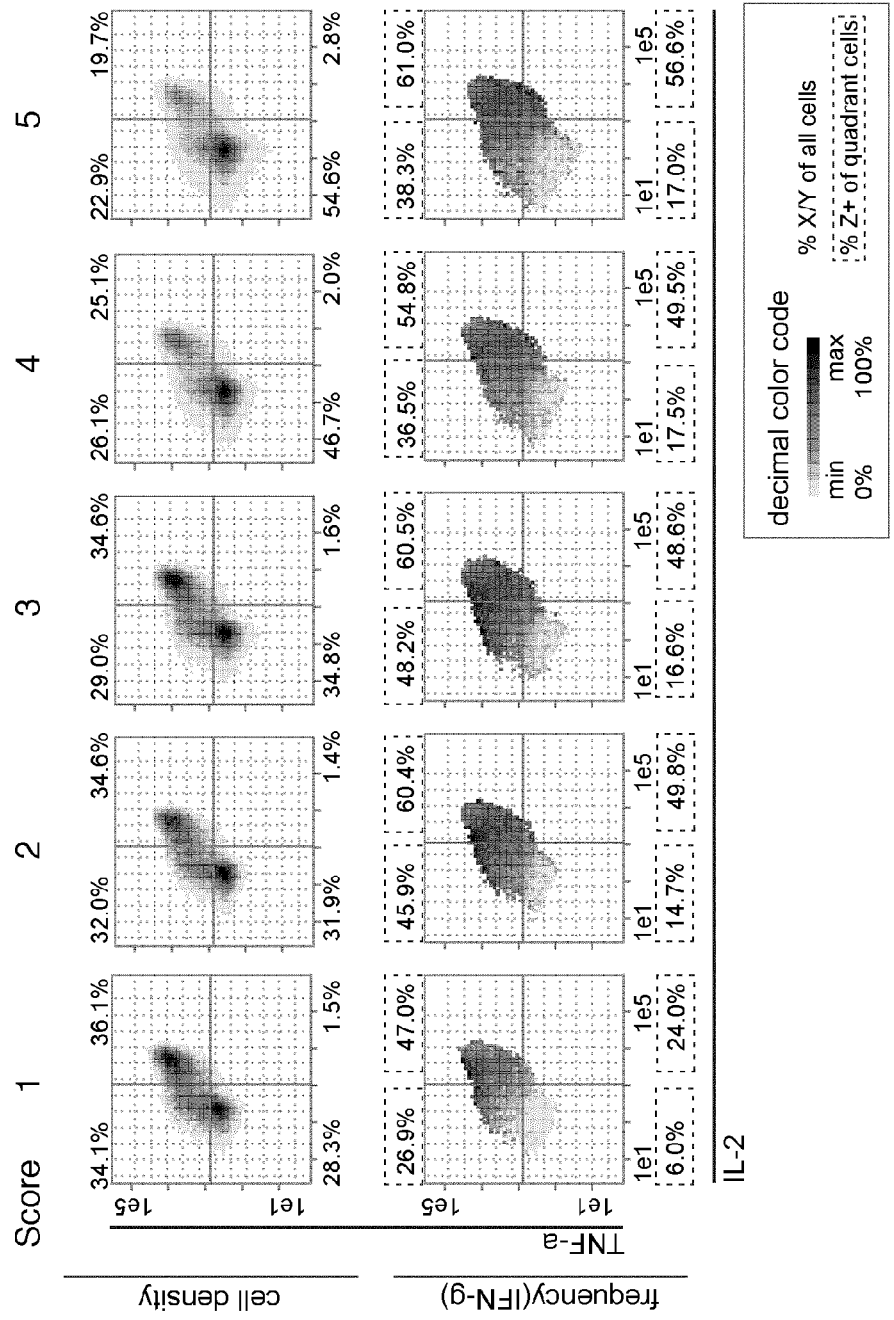

In FIG. 2, FIG. 3 and FIG. 4, triplots are shown. A triplot is a graphical representation. A triplot can comprise a coordinate system, wherein the first binned marker intensity of the combination of two binned marker intensities is associated to the abscissa, and the second binned marker intensity of the combination of two binned marker intensities is associated to the ordinate. The at least one associated marker function and/or the third marker intensity can be represented by a colour according to a predefined colour scale.

The triplot can represent an analysis of a flow cytometry measurement. In an embodiment, CD4+ T cells from NZBW mice are used. For intracellular cytokine staining, cells can be stimulated with 10 ng/ml phorbol 12-myristate 13-acetate (PMA) and 1 µg/ml Ionomycin (Sigma) for 1 h followed by additional 3 h in the presence of 5 µg/ml BFA (Sigma). Cell surfaces can be stained with antibodies in the presence of 100 µg/ml 2.4G2 (FcγRII/III; purified from hybridoma supernatants) in order to reduce unspecific antibody binding. Cells can be fixed with 2% paraformaldehyde followed by an intracellular staining in 0.5% saponin. In an embodiment, for intracellular staining of transcription factors, cells are fixed with Foxp3 fixation buffer (eBioscience), stained in Foxp3 permeabilization buffer (eBioscience). A fixable LIVE/DEAD stain (Life Technologies) can be used to discriminated between a living cell and a dead cell. The expression of phenotypic markers can be determined with a BD Fortessa (BD Biosciences) and analyzed with FlowJo (Treestar).

In an embodiment a severity of a disease is determined by scoring the mice according to levels of proteinuria (Uristix, Siemens, #2857), weight and levels of anti-ds DNA antibodies.

A flow cytometry measurement can provide raw data, comprising a plurality of raw intensities related to the respective markers each being associated to a specific entity of a cell. In an embodiment, the raw intensities can be transformed, generating the associated detected intensities. In an embodiment, the transformation can be an inverse hyperbolic sine transformation.

The first binned marker intensity can be the binned marker intensity with respect to the cytokine tumour necrosis factor alpha (TNF-α). The second binned marker intensity can be the binned marker intensity with respect to the lymphocyte homing receptor CD44 (FIG. 2, FIG. 3).

The associated marker function can be a cell density per bin (FIG. 2A). Alternatively, the marker function can be associated to the cytokine interferon-γ (IFN-γ). It can be a frequency of IFN-γ-producing cells (FIG. 2B). In an embodiment the marker function is a mean fluorescence intensity (MFI) of IFN-γ (FIG. 2C).

The triplots can be easily interpreted and compared with each other. The frequency of IFN-γ-producing cells is low in the two lower quadrants which are related to a low binned CD44 intensity (FIG. 2B). In the upper right quadrant (high TNF-α and high CD44), the frequency of IFN-γ-producing cells is highest (FIG. 2B). The region of the triplot showing the highest frequency of IFN-γ-producing cells also shows the highest MFI of IFN-γ (FIG. 2C). The highest cell density is present in the upper left quadrant which is related to a low TNF-α intensity and high CD44 intensity (FIG. 2A).

In an alternative embodiment, the marker function is one of a mean fluorescence intensity of IFN-γ only of IFN-γ-producing cells (IFN-γ+ cells) (FIG. 3A), a mean fluorescence intensity of the cytokine interleukin 2 (IL-2) only of IL-2-producing cells (IL-2+ cells) (FIG. 3B), and a mean fluorescence intensity of the cell surface receptor programmed cell death protein-1 (PD-1) only of PD-1-producing cells (PD-1+ cells) (FIG. 3C).

A "pseudo-multiparametric viewing" can be provided, by indicating the area related to MFI of IFN-γ (FIG. 2C). Bins in grey depict areas which contain <10 cells positive for IFN-γ or IL-2 or PD-1 (FIG. 3). The bins in grey are overlaid by plotting an additional marker function on the same plane characterised by the first and the second binned intensities. This provides an easy characterisation of cells in certain bins.

FIG. 4 illustrates an embodiment in that the method is used to analyse feature sets related to different disease stages, indicated by a score number. It shows (upper row) that the cell density in the upper right quadrant (IL-2+TNF-α+ double positive cytokine producing cells) decreases with increasing score number. It shows (lower row) that the frequencies of IFN-γ+ cells in the upper right quadrant (triple positive cytokine producing cells) and lower right quadrant (IL-2+IFN-γ+ double positive cytokine producing cells) increases with increasing score number.

Figure 5:
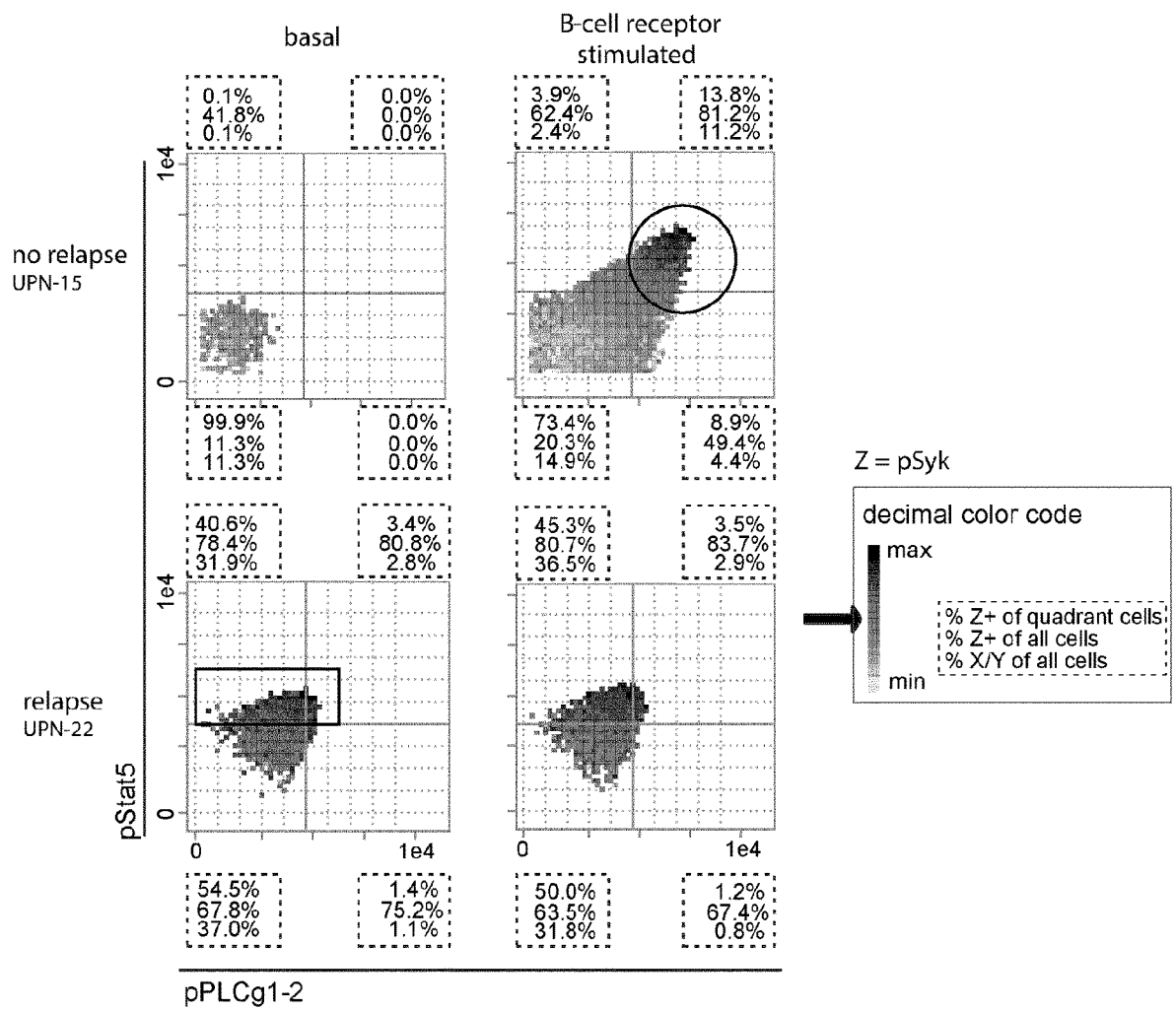

FIG. 5 shows an example for the applicability of the method according to the invention, demonstrating that the method allows for automatically selecting and visualizing the feature set of labelled cells that exhibits the pronounced differences between two groups of cells.

In the example shown, a better selection and of relapse features of childhood leukaemia is shown.

The example provides a means for comparison of patterns of peripheral B cells concerning patients with relapse vs. no relapse and basal (unstimulated) vs. B-cell receptor-stimulated blood samples.

The original data has been acquired by Good et al.

In the example, an analysis of mass cytometry data of gated peripheral B cells is shown. The cell samples were acquired from patients having a relapse and patients with no relapse. The triplots associated to the label "UPN-22" and the label "UPN-15" relate to the patients number and data set from said patients as indicated in Good et al.

Triplots for visualization of the combinatorics of three parameters/labels show mean signal intensities (MSIs) of small bins (with at least 10 cells per bin) of a marker. The frequencies of the quadrants are given outside of the respective corner.

The selected feature set comprises the marker combination of phosphorylated and thereby activated signaling molecules in cells: signal transducer and activator of transcription 5 (pStat5; y-axis), Phospholipase C gamma 1-2 (pPLCg1-2; x-axis) and the spleen tyrosine kinase (pSyk; z-axis) of the triplot. The triplot comprises the respective marker intensities. The marker intensities are binned as previously elaborated.

When comparing the basal samples ("basal" triplot column) of patients having a relapse to patients with no relapse, it can be seen that the pSyk marker intensities per cell of relapsed patients are significantly higher and slightly shifted (indicated by a black rectangle in the lower left triplot). The marker intensity for pSyk is indicated by means of as a grey scale look-up table shown to the right of the triplots and indicated by an arrow.

Moreover, from the lateral shift towards the black rectangle, it can be seen that the basal pSTAT5 pre-activation is present in the relapse but not in the no-relapse samples, as indicated by the black rectangle overlaid to the lower left triplot.

In addition, when the samples are stimulated by B-cell receptor (BCR), a drastic activation of PLCg in no-relapse samples can be observed (indicated by the black circle in the upper right triplot).

The triplots generated by the method according to the invention allow for a clear differentiation between these two samples.

Figure 6:
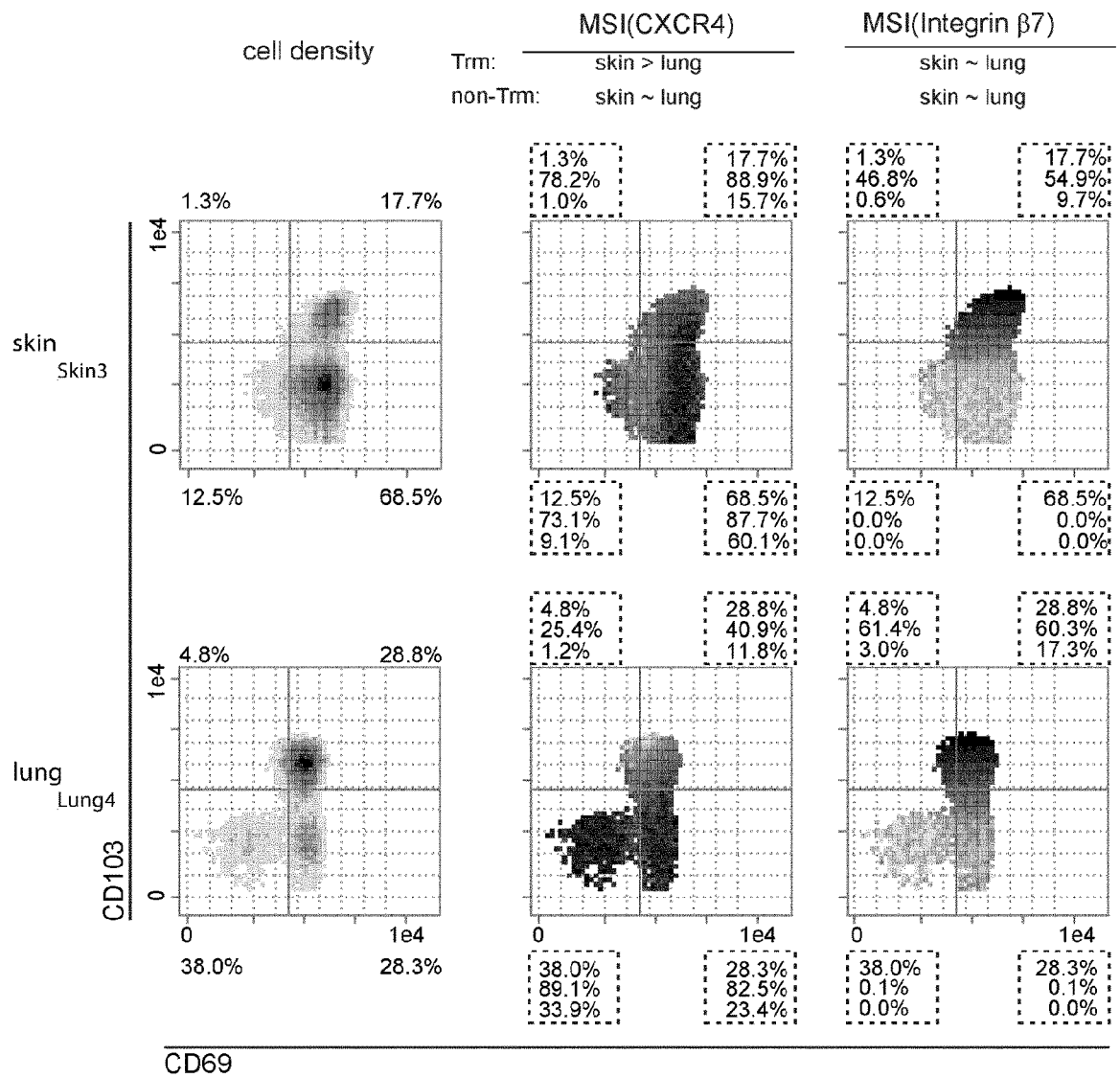

Another example of the applicability of the method according to the invention is shown in FIG. 6, where triplots are used for identification and visualization of a tissue-specific T-helper cell subset.

The example demonstrates the comparison of patterns of tissue resident memory T (Trm) cells in skin vs. lung. The data set has been taken from Wong et al. Specifically the triplots labeled with "lung4" and "skin3" refer to the corresponding data sets in Wong et al.

FIG. 6 shows a variety of triplots. For all triplots the x-axis shows the binned signal for markers labelled to the surface receptor cluster of differentiation 69 (CD 69) and the y-axis comprises binned signals for markers labelled to the surface receptor cluster of differentiation 103 (CD 103). If a bin contains the minimum number of 10 cells, a statistical feature is calculated such as cell density, or intensity of the color coded marker.

In the left-most column triplots for density of the T cells are shown for lung (lower triplot) and skin (upper triplot) respectively. Cell densities having said marker combination are depicted according to a grey scale shown in the decimal color code.

In the middle column triplots are shown for mean signal intensities (MSIs) of a marker labeled to the C-X-C chemokine receptor type 4 (CXCR4) in grey scale according to the color code, again for skin (upper triplot) and lung (lower triplot).

In the right column triplots are shown for mean signal intensities (MSIs) of a marker labeled to the transmembrane receptor integrin beta-7 (Integrin β7) in grey scale according to the color code, again for skin (upper triplot) and lung (lower triplot).

The boxed numbers associated to each quadrant of the triplot are the relative frequencies as detailed in the decimal color code, i.e. the percentage in the highest row indicates a number of Z+ cells in the quadrant, the number below indicates a number of Z+ cells per sample and the number in the lowest row indicates the percentage of Z+ cells per quadrant to all Z+ cells. Z+ refers to cells that exhibit the marker that is color coded, i.e. that is plotted along the z-axis.

The triplots enable identification of differences in patterns of skin and lung tissue resident memory T (Trm) cells and show the following main results.

There is a CXCR4 negative or low-expressing population of cells in bins with CD103 high-expressing cells and CD69 low-/intermediate expressing cells (CXCR3high) in the lung but not in skin tissue.

There is a very strong correlation of CD103 and Integrin β7 in both, skin and lung tissue.

The label "Trm: skin>lung" refers to the situation that the MSI of skin cells compared to lung cells is higher in the Trm quadrant (upper right quadrant of the respective triplot, also referred to as "Q3" or "CD69+CD103+").

The label "Trm: skin~lung" means that the MSIs of skin cells compared to lung cells are similar.

The label "No-Trm: skin~lung" means that all other quadrants are non-Trm cells.

FIG. 7 illustrates the PRI machine learning approach with a data set provided by Spitzer et al.. Data processing of a given data set is the most important part of machine learning to create valuable features. It is called feature engineering (FE). FE in the method according to the invention uses and combines processes such as binning, variable transformation, and in particular combinatorial parameter extraction of three or more markers. All generated features are stored in a single table (each sample in one row with each column as an input feature) for the machine learning approach.

FIG. 7 Panel A: Transition of conventional contour plot to bin plot

Firstly, data set as depicted in form of a contour plot according to Spitzer et al. is provided to the method. The bi-axial contour plot area of basis markers, here exemplarily CD90 and CD44 markers, is distributed in quadrant bins of equal sizes of arc sin h(x)=0.2, resulting in a grid of bins. Measurement data acquired from cells falling into a specific bin are captured and displayed if a minimum number of five cells is reached. This number can be user defined, and might be higher or lower for other instances. The number of cells in the bins are displayed in grey scale: low values are represented by grey, median values by darker grey and high values by black.

Subsequently, the grid of bins can be extended with a statistical information such as cell density, standard deviation and relative standard error of the means, and other information about the third marker Z for each bin by the calculation of, for example, MSI, MSI(+) and frequency of marker Z+. Every cell having said marker is referred to Z+.

In this example, this bin scaffold is used for further investigation. With a total number of 31 protein markers, this results to B (m=31)=½×(31−2)×(31−1)×31=13,485 bin plot matrices for each observation (N=12), and can be used as input for machine learning approaches or as visualization in the form of bin plots for validation by manual inspection.

FIG. 7 panel B: Further feature engineering from bin plots

A first attempt to transform the bin plot matrix information into informative features as basis in a supervised machine learning approach for feature ranking (FR). The workflow provides an additional FE step which endorses the usage of a computational approach by filtering the bin plots to those whose three marker combinations are most significant and differentiating between two groups.

The range of the bins in a bin plot (here: MSI) is evenly divided into four rectangular sections. Depending on the selected calculation method, either mean, maximum, variance, relative or absolute range of the bin values in these bin plot sections are extracted and added to the feature table (here: absolute range). According to the expert knowledge, values of section S1 are much less informative in this study because these areas contain double negative cells (X-Y-) and background signals from other markers, and are consequently filtered out. As a result, the feature table construction is similar to the bin plot matrix calculation. With m=31 number of protein markers and sections of s=4, the total feature count consists of p(m=31;q=4)=½×(31−2)×(31−1)× 31×3=40,455 section values for each sample. The emphasis is on values and not matrices.

FIG. 7 panel C: Section information as input variables in machine learning model FIG. 7 panel C shows an overview of the method according to the invention resulting in the final collected features which are highly differentiating between both groups (effective and ineffective treatment). The elastic-net regularized logistic regression as the machine learning approach was applied in two consecutive cross validation (CV) runs to tune the regularization parameters alpha and lambda. Alpha tunes the algorithm towards either L1 (LASSO) or L2 (ridge) regularizations, and lambda tunes the feature restriction of each CV. To estimate the performance of each configuration, the error rates (deviances) of these models are determined. The tuning of both parameters is processed in two consecutive CVs.

The entire pre-processed example data set (12 samples with 40,455 features) is divided into k=3 folds, meaning one third of the training set is left out for the internal validation (full set in first CV cycle=4/4/4, training set in second CV cycle=3/3/4), k=3 is considered to be a good trade-off between having at least one condition in one fold and still have some variance and stability with at least one more sample of a condition. To vary the partition and support the stability of the model, the folds are resampled and stratified in each CV iteration. In this way, each row is assigned to a random fold with both treatments integrated.

Alpha is iterated in the first CV run between 0 and 1 with step size=0.1. For each alpha the error rates are collected and after one full iteration of alpha, the global minimal deviance determines the best alpha in this iteration. The final alpha is the one that has the highest count after 100 iterations.

To overcome the p>>N problem, the algorithm was applied in a nested CV with the final alpha and two additional measurements to evaluate the resulting model and features. 500 iterations were processed. The test set consists of only two samples, one representative from each condition. Hence, the test set is very small compared to the likewise small training set of ten samples. Root mean square error (RMSE) is used for this purpose. Features from each CV run are only collected if the difference from RMSE of the test and training set is lower than 0.05. This restricts to usage of the features of the model to only those that do not lead to overfitting, and the CV iteration is then termed successful. A final restriction is not applied to the model but to the selected features. The features from each successful CV run are individually tested if the means of the features between both treatment groups are significantly different. Given that these samples are independent from one another, unpaired two-sided t-tests are deployed with adjustments on the p-values using the Benjamini and Hochberg correction method. Finally, 97 different features are selected from the models, which are significant between both treatments.

LITERATURE REFERENCES

Spitzer et al.: Spitzer, M. H., Gherardini, P. F., Fragiadakis, G. K., Bhattacharya, N., Yuan, R. T., Hotson, A. N., Finck, R., Carmi, Y., Zunder, E. R., Fantl, W. J., et al. (2015). An interactive reference framework for modeling a dynamic immune system. Science 349, 1259425.

Wong et al.: Wong, M. T., Ong, D. E. H., Lim, F. S. H., Teng, K. W. W., McGovern, N., Narayanan, S., Ho, W. Q., Cerny, D., Tan, H. K. K., Anicete, R., et al. (2016b). A High-Dimensional Atlas of Human T Cell Diversity Reveals Tissue-Specific Trafficking and Cytokine Signatures. Immunity 45, 442-456.

Good et al.: Good Z, Sarno J, Jager A, et al. Single-cell developmental classification of B cell precursor acute lymphoblastic leukemia at diagnosis reveals predictors of relapse. Nat Med. 2018; 24(4):474-483.

The invention claimed is:

1. Method for classifying selected marker signals from cytometric measurements comprising a first measurement and a second measurement, wherein the first measurement comprises a cytometric measurement acquired from a first sample of $N_1$ particles, and the second measurement comprises a cytometric measurement acquired from a second sample of $N_2$ particles, $N_1$ being the number of particles in the first sample and $N_2$ being the number of particles in the second sample, wherein each particle $n^i_{N1}$ of the $N_1$ particles of the first sample is labelled with a number of $L_1$ fluorescent, mass or oligo markers $l^i_{N1}$, each particle $n^i_{N2}$ of the $N_2$ particles of second sample is labelled with a number of $L_2$ fluorescent, r mass or oligo markers $l^i_{N2}$, wherein the first measurement acquires for each particle $n^i_{N1}$ a detected intensity $p^{ij}_{N2}$ of each marker $l^j_{N1}$ of the particle and the second measurement acquires for each particle $n^i_{N2}$ a detected intensity $p^{ij}_{N2}$ of each marker $l^j_{N2}$ of the particle, the method comprising the steps of:
   a) binning the detected intensities of each marker $l^j_{N1}$ of the first measurement into an associated first number $B_{11}$ of bins,
   b) generating at least one associated marker function, in particular a ratio of the binned intensities, of two markers or a number of particles per bin of a marker,
   c) generating from the first measurement a number of $S_1$ first feature sets, each first feature set relating a different combination of two binned marker intensities and the at least one associated marker function or a third marker intensity to each other,
   d) binning the detected intensities of each marker $l^j_{N2}$ of the second measurement into an associated second number $B_{12}$ of bins,
   e) generating at least one associated marker function, in particular a ratio of the binned intensities, of two markers or a number of particles per bin of a marker,
   f) generating from the second measurement a number of $S_2$ second feature sets, each second feature set relating a different combination of two binned marker intensities and the at least one associated marker function or a third marker intensity to each other, wherein each first feature set and each second feature set comprising the same combination of markers intensities or functions, form a pair of feature sets, and
   g) providing the pairs of feature sets to a machine learning method, wherein the machine learning method determines at least one selected pair of feature sets that exhibits the largest variation between the first and the second feature set.

2. Method according to claim 1, characterised in that each feature set is provided to the machine learning method in form of a graphical representation.

3. Method according to claim 1, characterised in that prior to the cytometric measurement a first solution is applied to the first sample of particles and a second solution is applied to the second sample of particles, wherein the first solution is a control medium or the first solution comprises one of a: first stimulating compound for stimulating the particles, a first inhibiting compound for inhibiting the particles or a first combination of a first stimulating and a first inhibiting compound, and wherein the second solution is a control medium or the second solution comprises one of a: second stimulating compound for stimulating the particles, a second inhibiting compound for inhibiting the particles or a second combination of a second stimulating and a second inhibiting compound.

4. Method according to claim 1, characterised in that the first sample of particles comprises particles of a first type and the second sample of particles comprises particles of a second type.

5. Method according to claim 1, characterised in that the machine learning method determines a selected plurality of pairs of feature sets, wherein each pair of feature sets of the selected plurality of pairs of feature sets exhibits a variation between the first and the second feature set larger than a predefined threshold.

6. Method according to claim 1, characterised in that a third measurement is provided wherein the third measurement comprises a cytometric measurement acquired from a third sample of $N_3$ particles, $N_3$ being the number of particles in the third sample, wherein each particle $n^i_{N3}$ of the $N_3$ particles of the third sample is labelled with a number of $L_3$ fluorescent, mass or oligo markers, wherein each fluorescent, mass or oligo marker $l^j_{N3}$ of the $L_3$ fluorescent, mass or oligo markers is associated to a different entity of the respective particle $n^i_{N3}$, wherein the third measurement comprises for each particle $n^i_{N3}$ the detected intensity $p^{ij}_{N3}$ of each marker $l^j_{N3}$ of the respective particle, wherein the detected intensities of each marker $l^j_{N3}$ of the third measurement are binned into an associated third number $B_{13}$ of bins, wherein at least one associated marker function is generated, wherein from the third measurement a number of $S_3$ third feature sets are generated, each third feature set relating a different combination of two binned marker intensities and the at least one associated marker function or a third marker intensity to each other, wherein the third feature sets are compared with the first or the second feature sets, and wherein a weight measure is determined that gives a probability for particles of the third sample to be associated with the first sample or the second sample.

7. Method according to claim 1, characterised in that the machine learning method is one of:
a naïve Bayes classifier algorithm,
a K means clustering algorithm,
a support vector machine algorithm,
a linear regression,
a logistic regression,
a random forest,
a decision tree,
a nearest neighbour algorithm,
an artificial neural network.

8. Method according to claim 1, characterised in that the graphical representation of each feature set, particularly of the feature sets comprised in the at least one selected pair of feature sets, comprises a coordinate system with an abscissa and an ordinate, wherein the two binned marker intensities of the feature set are plotted along the abscissa and the ordinate, and the at least one associated marker function or the third marker intensity is represented by a colour according to a predefined colour scale or a grey level according to a predefined grey scale.

9. Method according to claim 1, characterised in that at least one of the following is displayed on a display:—the at least one selected pair of feature sets, —the graphical representations of the feature sets comprised in the at least one selected pair of feature sets, —the two binned marker intensities and the at least one associated marker function or a third marker intensity associated to the at least one pair of feature sets, —the selected plurality of pairs of feature sets, —a plurality of graphical representations of the feature sets comprised in the selected plurality of pairs of feature sets, or—the two binned marker intensities and the at least one associated marker function or a third marker intensity associated to the plurality of selected pairs of feature sets.

10. Method according to claim 1, characterised in that the number of $L_1$ fluorescent, mass or oligo markers or the number of $L_2$ fluorescent, mass or oligo markers or the number of $L_3$ fluorescent, mass or oligo markers comprises at least three fluorescent, three mass or three oligo markers, in particular at least ten fluorescent, mass or oligo markers, in particular at least 20 fluorescent, mass or oligo markers, in particular at least 50 fluorescent, mass or oligo markers, in particular at least 100 fluorescent, mass or oligo markers.

11. Method according to claim 1, characterised in that the predefined first number of bins the predefined second number of bins or the predefined third number of bins is at least 4, is in particular at least 10, is in particular at least 20, is in particular at least 50, is in particular at least 100, is in particular at least 200, is in particular at least 300, is in particular at least 500.

12. Method according to claim 1, characterised in that before step g) each first feature set or r each second feature set is filtered, particularly by means of a noise filter.

13. A computer programme comprising instructions which, when the programme is executed by a computer, causes the computer to carry out at least the steps a)-g) of the method of claim 1.

* * * * *